United States Patent [19]
Morgenthaler et al.

[11] 3,953,613
[45] Apr. 27, 1976

[54] METHOD OF AND APPARATUS FOR THE TRANSVERSE FOLDING OF DOUGH BAND SECTIONS

[75] Inventors: Eugen Morgenthaler, Kirchberg; Ruedi Seewer, Burgdorf, both of Switzerland

[73] Assignee: Seewer AG, Burgdorf, Switzerland

[22] Filed: Oct. 24, 1974

[21] Appl. No.: 517,595

[30] Foreign Application Priority Data
Aug. 17, 1974 Germany............................ 2439496

[52] U.S. Cl................................ 426/502; 99/450.1; 270/68 R
[51] Int. Cl.²......................................... A21C 11/00
[58] Field of Search........................... 99/450.1, 353; 270/68 R; 93/84; 271/175, DIG. 9; 426/502

[56] References Cited
UNITED STATES PATENTS

| | | | |
|---|---|---|---|
| 2,770,457 | 11/1956 | Jesus................................ | 270/68 R |
| 3,664,432 | 5/1972 | Nunes, Jr..................... | 270/68 R X |
| 3,804,637 | 4/1974 | Rejsa................................ | 99/450.1 |
| 3,865,963 | 2/1975 | Gugler........................... | 426/502 X |

Primary Examiner—Robert W. Jenkins
Assistant Examiner—James A. Niegowski
Attorney, Agent, or Firm—Werner W. Kleeman

[57] ABSTRACT

A machine for the transverse folding of dough band sections comprising a multiplicity of conveying tables each equipped with a driven conveying band, namely, a receiving conveying table which always conveys in the same direction, a first reversing conveying table subsequently arranged thereafter while leaving free a gap and a second reversing conveying table arranged at a spacing beneath both of the first mentioned conveying tables. Furthermore, there is provided an automatically operative control mechanism for the reversal of the drive of the conveyor bands of both reversing conveying tables in such a manner that a dough band section which is advanced by the receiving conveying table is forwardly moved over a predetermined portion of its length also by the first reversing conveying table, then the latter is reversed, a dough band loop which prevails at that time in the gap is taken-up by the second reversing conveying table and further advanced by a predetermined path or distance in order that a first portion of the dough band section which departs from the first reversing conveying table comes to bear upon a second portion of the dough band section bearing at the second reversing conveying table, and finally the second reversing conveying table is reversed in order that the dough part still running off the receiving table comes to bear at the first and second dough portions.

9 Claims, 15 Drawing Figures

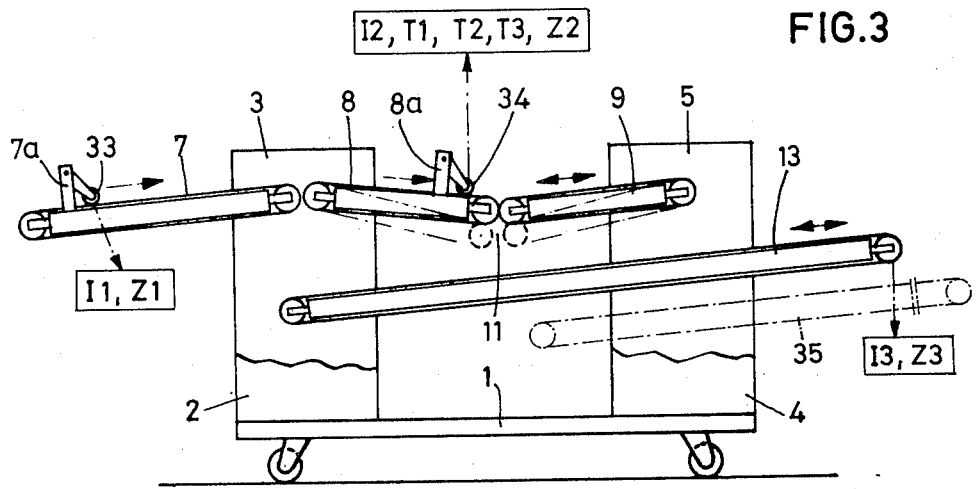
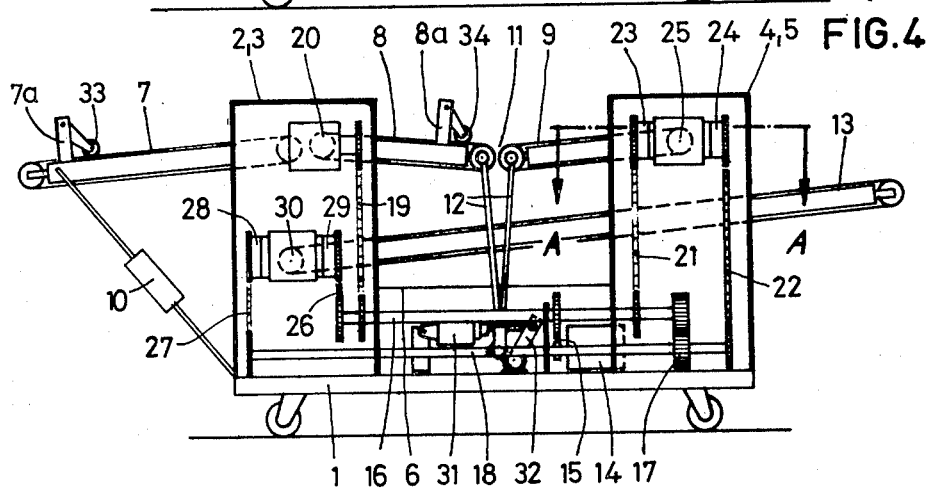
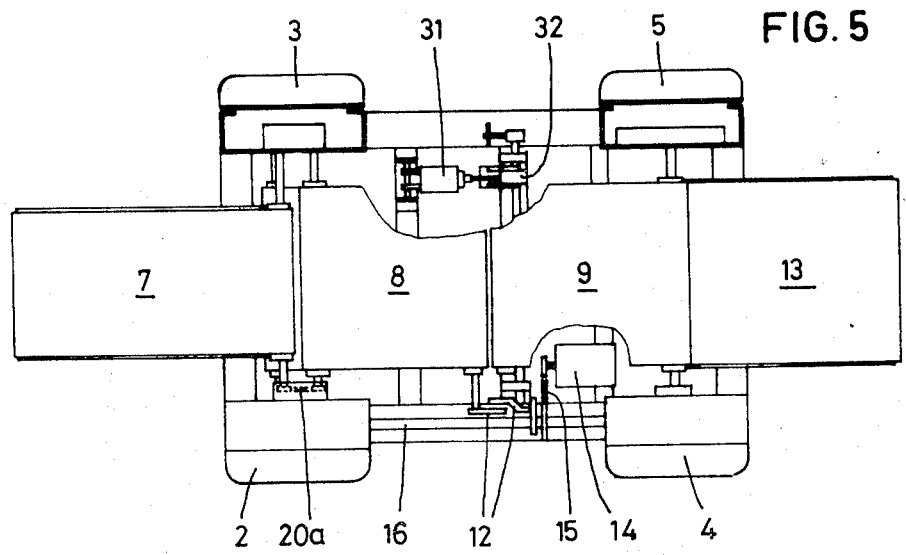

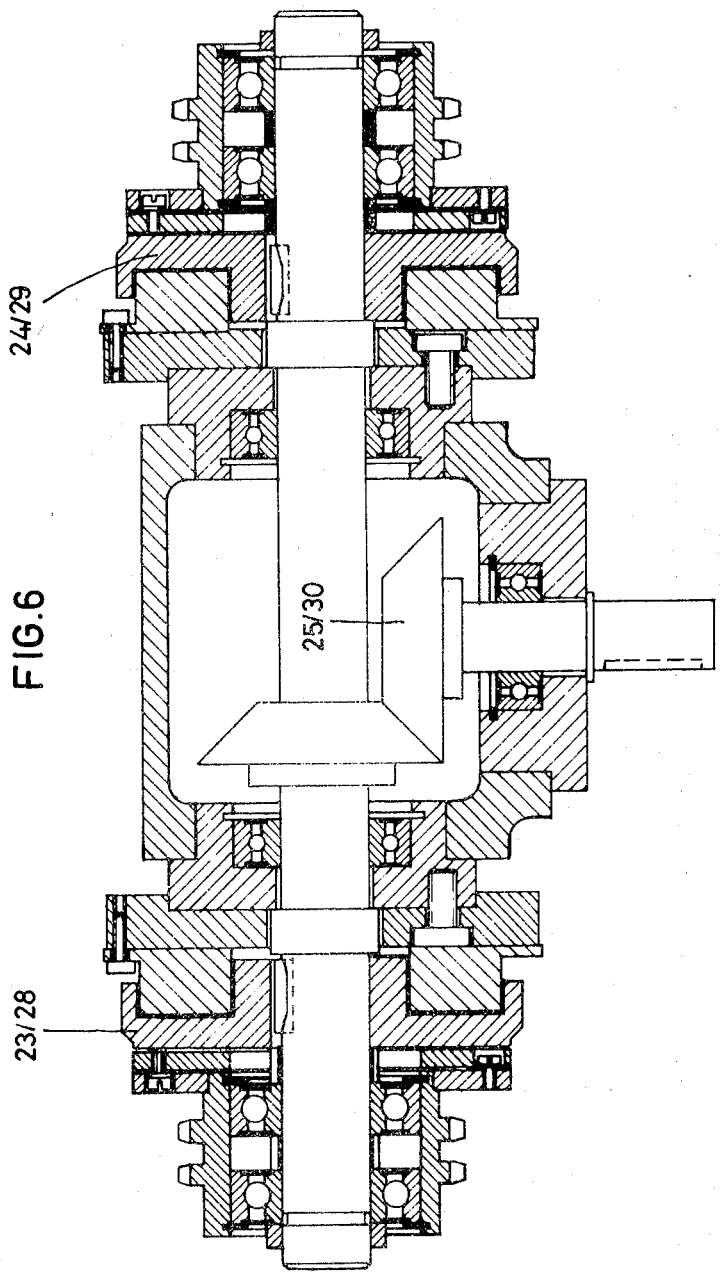

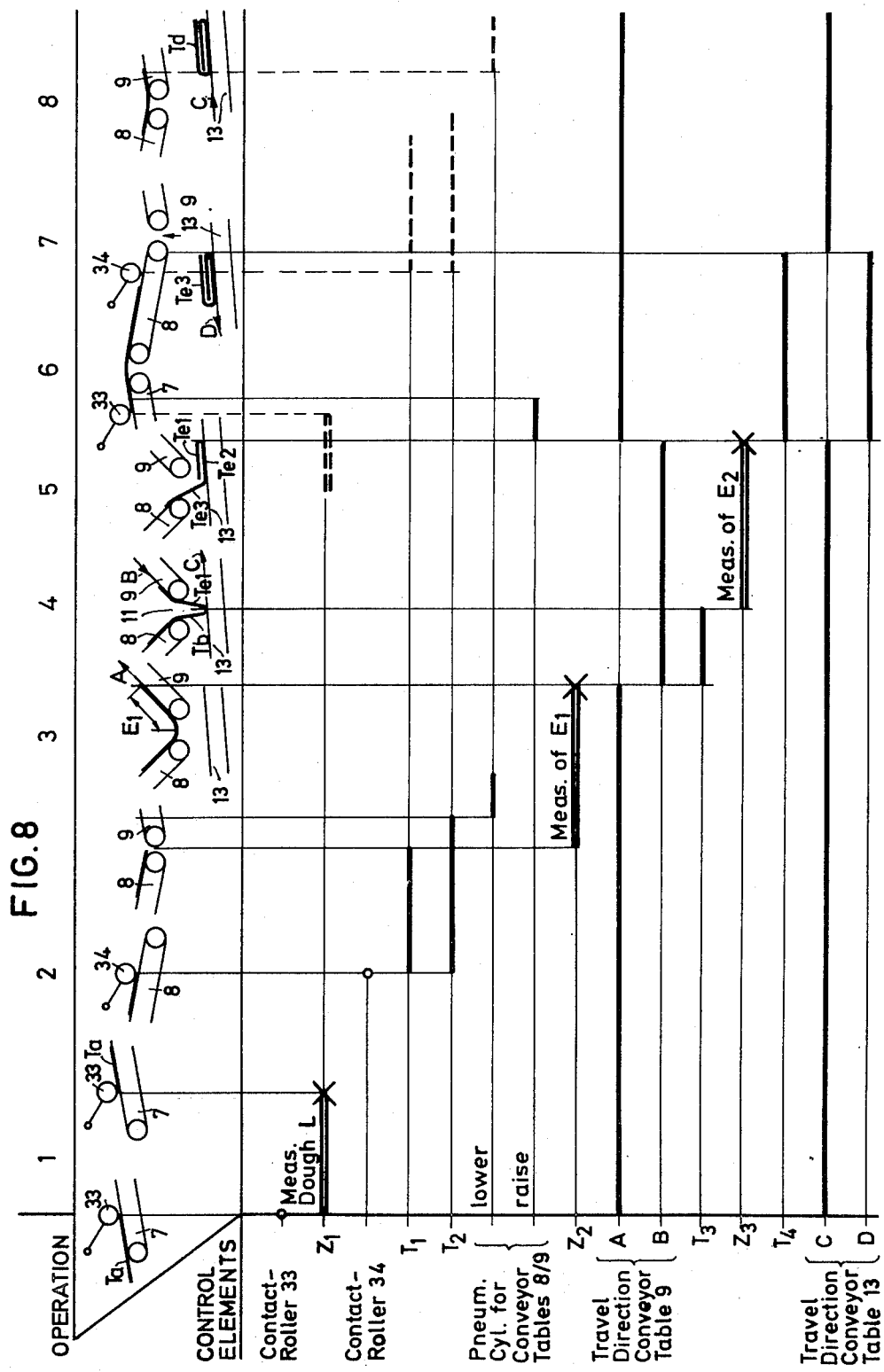

METHOD OF AND APPARATUS FOR THE TRANSVERSE FOLDING OF DOUGH BAND SECTIONS

BACKGROUND OF THE INVENTION

The present invention relates to a new improved construction of machine for the transverse folding of dough band sections.

Real sheet-like dough can be formed, as is known, in that a fatted or greased plate or a grease-flour mixture is introduced between an upper situated and lower situated dough band section, and this combination is rolled-out and folded, whereafter this rolling-out and folding operation is repeated a number of times. The thus obtained sheet-like dough is in the form of a laminate which consists of a great number of very thin dough layers and fat layers.

During the partial or completely manual performance of this production process it has been found suitable to carry out the folding operation such that two end portions of a band section are folded about transverse fold lines to a middle portion of approximately the same length, and which procedure is conventionally referred to in the art as "laminating." Among other things this has the advantage that the rolling-out operation can be carried out at a conventional rolling device and also the further advantage that at the fold lines, during the rolling-out operation, there cannot be squeezed out any of the fat or the like.

Conventional prior art dough band folding machines, for instance as taught in the German Patent Publication 1,150,936 or the British Patent Publication 1,059,979 which place onto a conveyor belt or band a random length of dough band in a zig-zag fold, cannot be used for the "lamination" operation. It is also to be taken into account that such dough band packages which are formed by multiple zig-zag layers cannot be rolled-down at one time to the thickness of the dough band, since otherwise the dough band experiences impermissively high tensional stresses and therefore ruptures.

Equally, it is of course not possible for the aforementioned purpose to use, for instance, machines which roll together into a simple laminate band two dough bands, between which there is strewn-in a fat-flour mixture, and to cut such into short sections and to deposit the latter in a roof-shingle arrangement or fish-scale arrangement upon an endless conveyor.

SUMMARY OF THE INVENTION

Hence, it is a primary object of the present invention to provide an improved construction of machine for the transverse folding of dough band sections which is not associated with the aforementioned drawbacks and limitations of the prior art proposals.

Another and more specific object of the present invention aims at the provision of a simple and reliably operating machine for the transverse folding of dough band sections which is particularly suitable for carrying out the "laminating"-operation.

Another objective is to provide a machine which is equipped with adjustable means which particularly render possible regulating the same ahead of time to different lengths and characteristics of the dough band section to be processed, but in operation ensures a completely automatic running of the operating cycles.

Now in order to implement these and still further objects of the invention, which will become more readily apparent as the description proceeds, the machine of this development for the transverse folding of dough band sections is manifested by the features that there are provided a multiplicity of conveyor tables each equipped with a driven conveyor band or belt, namely, a receiving conveyor table which always conveys in the same direction, a first reversing or reversible conveyor table which is subsequently arranged thereat while leaving free a gap or space and a second reversing or reversible conveyor table arranged at a spacing beneath the two first-mentioned conveying tables. Furthermore, there is provided an automatically operated control mechanism for the reversing of the drive of the conveyor bands of both reversing conveyor tables in a manner that a dough band section which is advanced from the receiving conveyor table is moved forwardly over a predetermined part of its length also by the first reversing conveyor table, then the latter is reversed, a dough band loop which then prevails in the gap is taken-up by the second reversing conveyor table and forwardly advanced through a predetermined path or distance in order that the first dough part which runs off the first reversing conveyor table comes to bear upon the second dough part which rests on the second reversing conveyor table, and subsequently the second reversing conveyor table is reversed in order that the dough part which still runs off from the receiving table comes to bear at the first and second dough parts.

According to a preferred exemplary embodiment there is additionally contemplated that the receiving conveyor table and the first reversing conveyor table are downwardly inclined towards one another. This arrangement favors to a high degree the formation of the dough band loop at the most favorable location of the dough band section.

This operation and also the further operations during the working cycle of the machine are additionally favored in that — in this exemplary embodiment — the receiving conveyor table and the first reversing conveyor table are mounted to be rockable up and down about shafts of their drive rollers which are located in spaced relationship from the gap, and that mechanism is provided which during the reverse or return movement of the first reversing conveyor table holds such and the receiving conveyor table in a lower downwardly rocked position than during the remaining portion of the work cycle of the machine.

BRIEF DESCRIPTION OF THE DRAWINGS

The invention will be better understood and objects other than those set forth above, will become apparent when consideration is given to the following detailed description thereof. Such description makes reference to the annexed drawing wherein:

FIG. 1 shows a "single or simple laminated" dough band and FIG. 2 a "double laminated" dough band;

FIG. 3 is a schematic longitudinal sectional view of the inventive machine including the illustration of the conveying table;

FIG. 4 is a total elevational view of the machine, wherein the drive assembly is shown in the open depicted housing located at the drive side;

FIG. 5 is a plan view of the entire machine;

FIG. 6 is a sectional view taken along the line A—A of FIG. 4 through a coupling assembly;

FIG. 8 is an operating schematic diagram illustrating the effective connections between the control elements and the actuated elements.

DETAILED DESCRIPTION OF THE PREFERRED EMBODIMENTS

Figure 1:
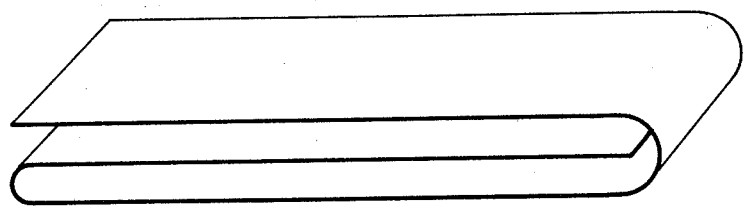
FIGS. 1 and 2 respectively show longitudinal sectional views of folded dough band sections, specifically

Describing now the drawings, with the laminating machine illustrated in FIGS. 3 to 5 there are installed at a travelling floor frame 1 at the servicing side two housings 3 and 5 at the drive side two housings 2 and 4; in the latter and in a lower situated box 6 which is arranged between the housings 2 and 4 there are accommodated most of the components of a drive assembly, whereas in the box 5 there is accommodated the entire electrical control device and in the box 3 an air preparation aggregate with pneumatic control valves.

In the housings 2 and 3 there are mounted the driven shafts of an infeed table 7 and a receiving conveyor table 8, and at the housings 4 and 5 there is mounted the driven shaft of a first reversing or reversible conveyor table 9. The frame of the infeed table 7 is supported by an adjustment or adjustable support 10 which can be varied in its length, whereas the neighboring end of the conveyor tables 8 and 9 which leave therebetween free a space or gap 11 are supported by the rods 12. At the four housings 2, 3, 4, 5 there is also attached the frame of a second reversing or reversible conveyor table 13 at a spacing beneath the conveyor tables 8 and 9.

The conveyor tables 7, 8, 9 and 13 possess in conventional manner a respective frame with a driven roller and a non-driven reversing or deflecting roller as well as an endless conveyor belt or band. A single motor 14 serves for the drive of the conveyor tables 7, 8, 9 and 13. It drives through the agency of a chain drive 15 a first transmission gear shaft 16 which, in turn, drives through the agency of a gear pair 17 a second transmission shaft 18 and by means of a chain drive 19 and a bevel gear drive 20 the receiving conveyor table 8 and from that location by means of a chain drive 20a also the infeed or delivery table 7. In the housing 4 the transmission shafts 16, 18 drive in the same sense through the agency of a chain drive 21 and 22 respectively, the driving elements of electromagnetic couplings 23 and 24 respectively, the driven elements of which are drivingly connected through the agency of a bevel gear drive 25 with the driving roller of the reversing or reversible conveyor table 9. In the housing 2 there are provided similar chain drives 26, 27, electromagnetic couplings 28, 29 and a similar bevel gear drive 30 for the reversing drive of the reversible conveyor table 13.

In FIG. 6 there are illustrated the coupling units or assemblies 23, 24 and 28, 29 respectively, with the bevel gear drives 25 and 30 respectively and the sprocket wheels which run in opposite sense loosely upon the continuous shaft for the reversible drive of the conveyor tables 8 and 13 respectively.

An air cylinder 31 which is pivotably mounted about a transverse shaft together with an angle lever 32 and rods 12 serves to rock or pivot up and down the conveyor tables 8 and 9.

Supports 7a and 8a, which are connected to the frames of the conveyor tables 7 and 8, carry by means of the pendulum arms contact rollers 33, 34, which during throughpassage of a dough band section deliver pulses to electronic elements, the function of which will be considered more fully hereinafter in conjunction with FIGS. 7a-7h and will be explained in detail also in conjunction with FIG. 8. Even at this point however the following is to be mentioned:

The contact roller 33 through the agency of a pulse transmittor I1 and the counter Z 1 measures the effective length L of the dough band section which passes through upon the infeed table 7.

The lifting of the contact roller 34 by means of the dough band which is lying on the receiving conveyor table 8 initiates in counters the running-off of pre-set times T1 and T2. A counter Z2 serves to measure a dough band partial length E1 as the same will be apparent by referring to position 3 of FIG. 8.

After a third time period T3, a counter Z3 which is operatively connected with the second reversing or reversible conveyor table 13 through the agency of the pulse transmittor I3 brings about the measuring of an advancement path E2 as the same will be apparent by referring to position 5 of FIG. 8.

The signals delivered by the counters according to the corresponding time expirations actuate via amplifier relays associated auxiliary relays whereby, a. through the agency of electromagnetic valves the pneumatic control is placed into operation for the rocking down and rocking up of the conveyor tables 8, 9 by the devices 31, 32, 12 and b. the therewith associated electromagnetic couplings 23, 24 and 28, 29 are switched-on and switched-off for bringing about a reversal of the conveying sense of the conveyor tables 9, 13.

The mode of operation of the machine and especially the just briefly described control device which allows for the automatic running of the functional cycles will be discussed more fully hereinafter in conjunction with FIGS. 7a-7h and the operating schematic diagram of FIG. 8, and specifically for the single lamination of a dough band section into a structure according to the showing of FIG. 1.

Mechanisms for automatically controlling the various operational cycles as described above and as shown in the diagram of FIG. 8 are well-known in the art. An example of such conventional mechanisms is disclosed in U.S. Pat. No. 3,664,432.

Figure 7A:
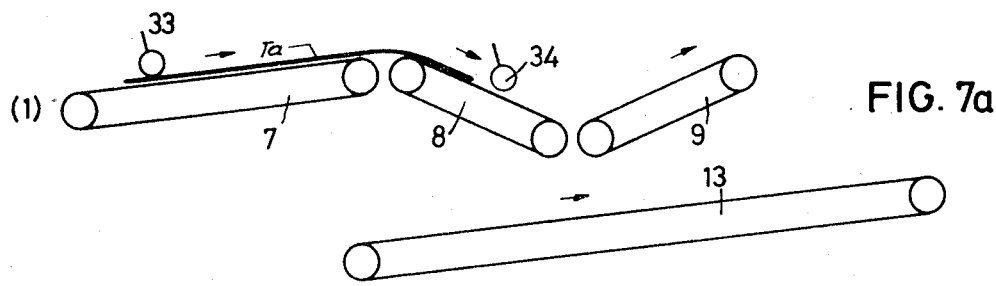
FIG. 7a-h are respective perspective views illustrating the working phases during the throughpassage of a dough band section.

OPERATION 1, FIG. 7a

A dough/fat/dough-band section Ta which is delivered from an upstream arranged machine aggregate with a roller device and transverse cutting device to the infeed table 7 lifts the contact roller 33, whereafter pulses are counted in counter Z1 by means of the pulse transmittor I1 driven by the contact roller 33 and stored (this operation constitutes measuring the dough band length L and storing the measurement value).

Figure 7B:
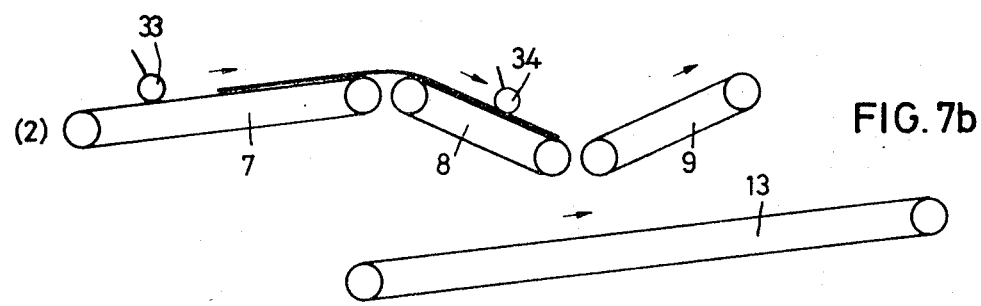

OPERATION 2, FIG. 7b

After completion of the throughpassage beneath the roller 33 the dough band lifts the contact roller 34 and the running of two adjustable times T1 and T2 begins.

After the expiration of the first time T1 a pulse transmittor I2, which for each unit of time delivers three times as many pulses as the pulse transmittor I1 delivers its pulses to a counter Z2 (measuring the dough band partial length E1, which is located at the first reversing conveyor table 9 which works in the conveying direction A).

Figure 7C:
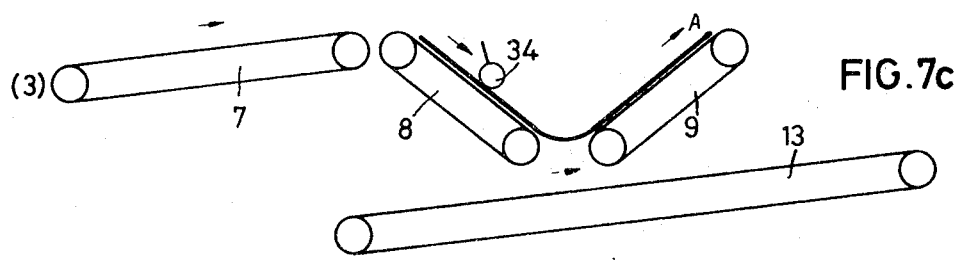

OPERATION 3, FIG. 7c

After the expiration of the second adjusted time T2 the conveying tables 8, 9 are rocked down by appropriately actuating the electromagnetic valve associated with the pneumatic lift cylinder 31.

Figure 7D:
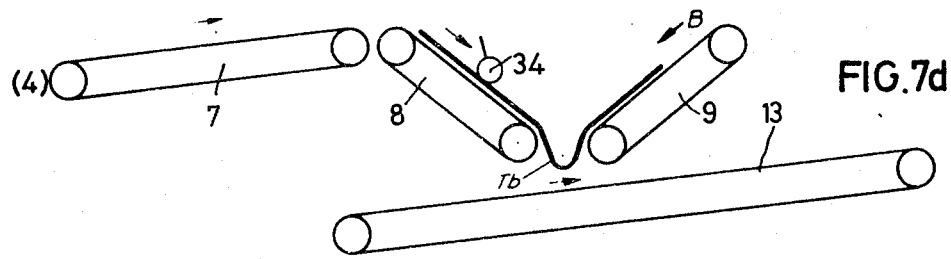

OPERATION 4, FIG. 7d

When the counter Z2 has stored the same number of pulses as the counter Z1 (i.e., when Z1 and Z2 are compensated and thus E 1 = 1/3 L), there then begins the running of an adjustable time T3 and by means of a delivered signal there is initiated via the coupling means 23, 24 the reversing of the conveyor table 9 which now works in the conveying direction B; it is for this reason that there is formed through the gap 11 the dough band loop T$b$.

Figure 7E:
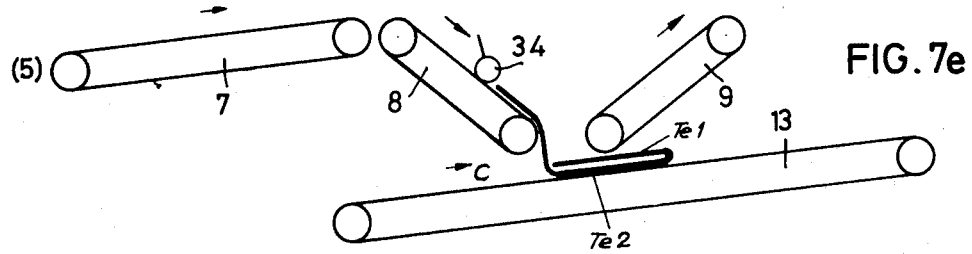

OPERATION 5, FIG. 7e

After expiration of the adjusted time T3 the dough band section T$b$ arrives at the reversing conveyor table 13 and the pulse transmittor I3 (which delivers per unit of time three times as many pulses as the pulse transmittor I1) supplies a counter Z3 for the measurement of the distance E2, through which there is removed the dough band loop T$b$ from the second reversing conveyor table 13 operating in the conveying direction C. The first dough band portion T$e$ 1 which simultaneously runs off from the first reversing conveyor table 9, while forming the first fold, arrives at the second dough band portion T$e$ 2 which is already lying at the second reversing or reversible conveyor table 13.

Figure 7F:
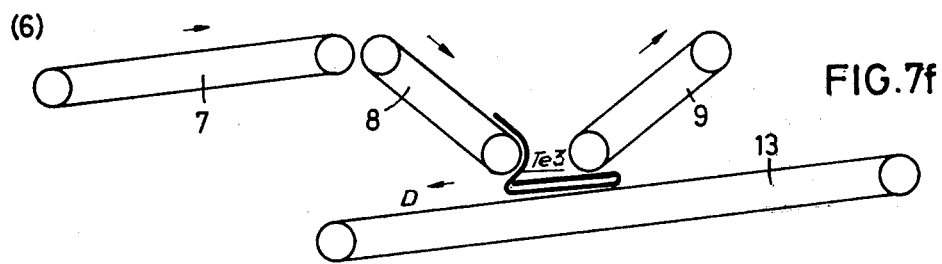

OPERATION 6, FIG. 7f

Upon equalization of the counters Z3 and Z1 i.e., when Z3 has stored the same number of pulses as the counter Z1 then there begins the running of a further adjustable time T4; at the same time there is brought about by a delivered signal via the coupling means 28, 29 the reversing of the conveyor table 13 from the direction of travel C to the direction of travel D. With the conveying direction D there is now freed the remaining dough band portion T$e$ 3 which still runs off from the receiving conveyor table 8 and while forming the second fold bears at the dough band portion T$e$ 1 so that there is formed the "simple laminated" dough band structure T$d$ which has been illustrated in FIG. 1.

Figure 7G:
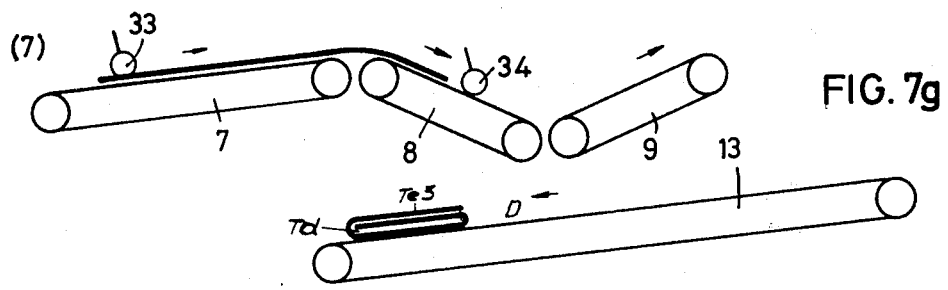

OPERATION 7, FIG. 7g

At the same moment the conveying tables 8, 9 are upwardly rocked into their starting position and the conveyor table 9 is reversed to its original direction of travel A. Consequently, there is again established at the dough infeed side of the equipment the starting conditions according to FIG. 7a and the next work cycle can be initiated.

Figure 7H:
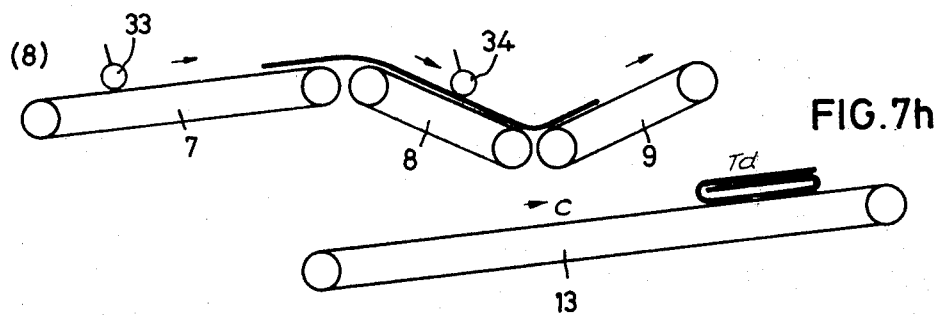

OPERATION 8, FIG. 7h

After expiration of the time T4 which has been adjusted during the operation 6, the conveying table 13 is again reversed by means of the coupling means 28, 29 and it conveys the dough band structure T$d$ in the direction of travel C so as to be transported away.

As far as the described exemplary embodiment is concerned there can be undertaken a number of variations and modifications.

Figure 2:
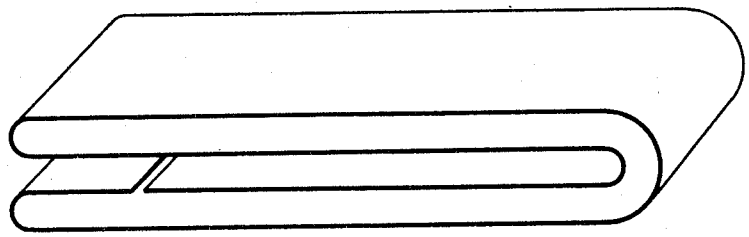

For the folding of the dough band sections so that there is formed the "double laminated" structure according to FIG. 2, there could also be provided an exemplary embodiment of machine which is similar to the described machine, wherein however — as indicated in broken lines in FIG. 30— there is arranged beneath the second reversing conveyor table 13 and staggered towards the front a third reversing conveyor table designated by reference character 35 (its frame is secured to the housings 2–5); such takes-up in advancing movement the dough structure delivered by the second reversing conveyor table 13 over a predetermined portion of its length, whereupon during the rearward running the remaining portion of the dough structure delivered by the second reversing conveyor table 13 comes to bear at the first taken-up dough portion, is taken-up and finally there is again conveyed in the forward direction the finished "double laminated" structure which is to be transported away.

While there is shown and described present preferred embodiments of the invention, it is to be distinctly understood that the invention is not limited thereto, but may be otherwise variously embodied and practiced within the scope of the following claims.

Accordingly, what is claimed is:

1. A method of operating conveyor tables to transversely fold a dough band section comprising the steps of providing a receiving conveyor table, a first reversing conveyor table and a second reversing conveyor table, said first reversing conveyor table being positioned subsequently of said receiving conveyor table and forming a gap therebetween, said second reversing conveyor table positioned beneath said receiving and first reversing conveyor tables, advancing a predetermined portion of a dough band section over said receiving and first reversing conveyor tables, reversing said first conveyor table to form a loop of the dough band section in the gap between said receiving and first reversing conveyor tables, advancing said second reversing conveyor table for a predetermined distance so that a first part of the dough band section running off said first reversing conveyor table comes to bear upon a second part of the dough band section which bears upon said second reversing conveyor table, and reversing said second reversing conveyor table so that a third part of the dough band section running off the receiving conveyor table comes to bear upon the first and second parts of the dough band section.

2. The method as defined in claim 1 including the steps of rocking said receiving and first reversing conveyor tables downwardly as the dough band section is advanced over said receiving and first reversing conveyor tables and maintaining said receiving and first reversing conveyor tables in a downwardly rocked position during reversal of said first reversing conveyor table.

3. A machine for the transverse folding of a dough band section, comprising a plurality of conveyor tables each having a conveyor band, said conveyor tables comprising a receiving conveyor table, a first reversing conveyor table arranged subsequently of said receiving conveyor table and positioned to form a gap between said receiving conveyor table and said first reversing conveyor table, and a second reversing conveyor table arranged beneath said receiving and first reversing conveying tables such that said gap is disposed above an intermediate portion of said second reversing conveyor table, means for driving each of said conveyor tables in a forward direction of motion to advance the conveyor bands thereof, means for reversing the direction of motion of said first and second reversing conveyor tables to drive the conveyor bands thereof in a rearward direction, automatically operating control means for controlling the direction of motion of said first and second reversing conveyor tables, said control means including means for sensing the position of the dough band section as it is advanced over said receiving conveyor table and said first reversing conveyor table, means operatively coupled between said sensing means and the reversing means of said first reversing conveyor table for actuating reversal thereof after a first predetermined portion of the dough band section has advanced over said first reversing conveyor table, the reversal of the direction of motion of said first reversing conveyor table causing the dough band section to be formed into a loop in said gap and bear against the conveyor band of said second reversing conveyor table, and means operatively coupled between said sensing means and the reversing means of said second reversing conveyor table for actuating reversal thereof after a second predetermined portion of the dough band section has advanced over said second reversing conveyor table.

4. The machine as defined in claim 3 including an infeed conveyor table having a conveyor band and arranged forwardly of said receiving conveyor table, means for driving said infeed conveyor table in a forward direction to advance the conveyor band thereof and means for sensing the length of the dough band section as it is advanced over said infeed conveyor table, said control means further including means for timing the reversal of said reversing conveyor tables in proportion to the sensed length of the dough band section.

5. The machine as defined in claim 3 wherein the predetermined portions of the dough band section are proportional to the sensed length of the dough band section and are substantially equal.

6. A machine for the transverse folding of a dough band section, comprising a multiplicity of conveyor tables, means for driving said conveyor tables, each of the conveyor tables being provided with a conveyor band, said conveyor tables comprising a receiving conveyor table which always conveys in the same direction, a first subsequently arranged reversing conveyor table positioned with a gap between the receiving conveying table and said first reversing conveyor table, and a second reversing conveyor table arranged in spaced relation beneath said receiving and first reversing conveyor tables, an automatically operating control means for reversing the drive means of the conveyor bands of said first and second reversing conveyor tables in a manner such that a dough band section which is advanced from the receiving conveyor table to the first reversing conveyor table is advanced over a predetermined portion of its length by the first reversing conveyor table, then said first reversing conveyor table is reversed, a dough band loop which is formed within said gap is taken-up by the second reversing conveyor table and advanced for a predetermined distance so that a first part of the dough band section running off the first reversing conveyor table comes to bear upon a second part of the dough band section which bears upon the second reversing conveyor table, and thereafter the second reversing conveyor table is reversed so that a third part of the dough band section running off the receiving conveyor table comes to bear upon the first and second parts of the dough band section.

7. The machine as defined in claim 1, wherein the receiving conveyor table and the first reversing conveyor table are downwardly inclined towards one another.

8. The machine as defined in claim 2, wherein the receiving conveyor table and the first reversing conveyor table are mounted to be upwardly and downwardly rockable about shaft means of drive rolls located in spaced relationship from said gap.

9. The machine as defined in claim 8, wherein said receiving conveyor table and said first reversing conveyor table are maintained in a downwardly rocked position during reversal of said first reversing conveyor table.

* * * * *

UNITED STATES PATENT OFFICE
CERTIFICATE OF CORRECTION

PATENT NO. : 3,953,613
DATED : April 27, 1976
INVENTOR(S) : Eugen Morgenthaler and Ruedi Seewer It is certified that error appears in the above-identified patent and that said Letters Patent are hereby corrected as shown below:

Column 8, claim 7, line 1 read "1" as --6--
Column 8, claim 8, line 1 read "2" as --7--

Signed and Sealed this

Nineteenth Day of October 1976

[SEAL]

Attest:

RUTH C. MASON
Attesting Officer

C. MARSHALL DANN
Commissioner of Patents and Trademarks